Feb. 22, 1938.     H. RINGER     2,109,016
CAMPING IMPLEMENT
Filed Jan. 23, 1937
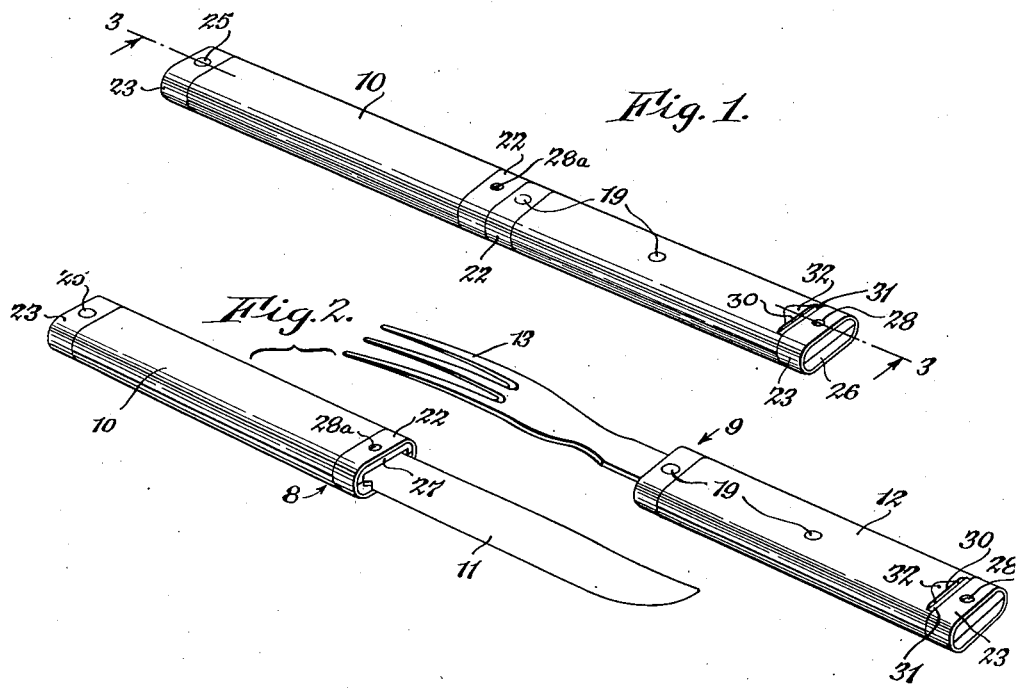
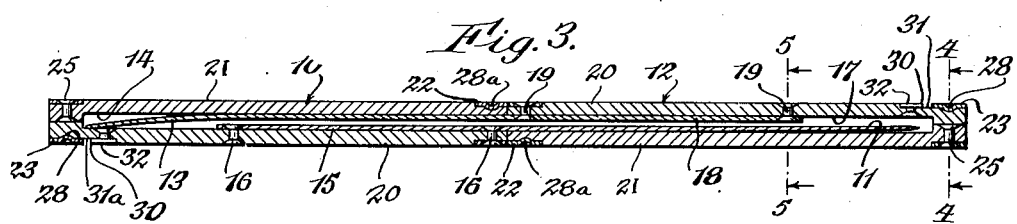
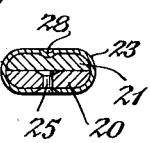
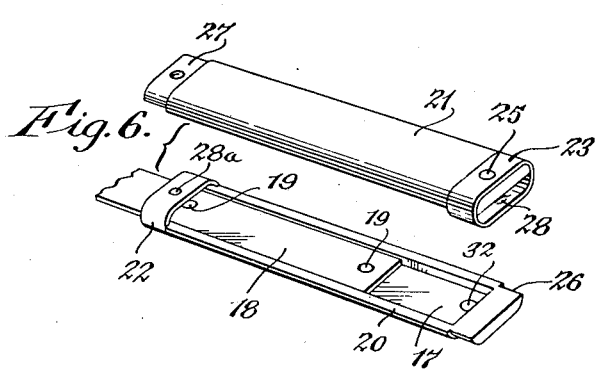
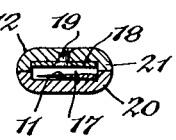
INVENTOR
*Henry Ringer*
BY
*John S. Powers*
ATTORNEY Patented Feb. 22, 1938

2,109,016

UNITED STATES PATENT OFFICE 2,109,016

CAMPING IMPLEMENT

Henry Ringer, Blasdell, N. Y.

Application January 23, 1937, Serial No. 122,045

1 Claim. (Cl. 30—143)

This invention relates to an implement having as companion separable parts a knife and a fork, the said implement, although being available for other purposes, being characterized by features which adapt it particularly for use in connection with camping, fishing, hunting and other allied outdoor sports.

One object of the invention is an implement of the kind generally described in which, as a measure of safety, provision is made for shielding the blade of the knife and the tines of the fork when the said parts are not in use.

A further object is to provide an implement in which the parts are so formed that when fitted together they will remain in such relation until separated for further use.

A still further object is to provide for facility in cleaning the parts of the implement.

The invention is illustrated in the accompanying drawing in which:

Figure 1 is a perspective view of an implement embodying the features of the invention.

Figure 2 is a perspective view showing the parts of the implement in separated relation.

Figure 3 is a longitudinal section through the implement and is taken along the line 3—3 of Figure 1.

Figure 4 is a transverse section taken along line 4—4 of Figure 3.

Figure 5 is a similar section taken along line 5—5 of Figure 3.

Figure 6 is a perspective view showing in separated relation the sections of the handle of the fork.

The instrument, as illustrated, consists of a knife 8 and a fork 9 (Figure 2), the handle and blade of the former being indicated at 10 and 11, respectively, while the handle and tines of the latter are indicated at 12 and 13, respectively.

In accordance with the invention the handle of the knife is formed with a longitudinally extending chamber 14 (Figure 3), the shank 15 of the blade 11 being arranged in the said chamber and being suitably secured to a side wall thereof by rivets 16. The chamber 14 is also adapted to accommodate the tines 13 of the fork when the latter is not in use. To this end the said chamber is of a height substantially greater than the thickness of the shank 15 of the knife, it being noted that the shank 15 of the blade 11 and the tines 13 of the fork are arranged in the chamber 14 in side-by-side relation. Preferably the chamber 14 is of a depth which will enable the tines 13 to be completely sheathed by the handle 10 as shown.

The handle 12 of the fork is formed with a longitudinally extending chamber 17 (Figure 3), the shank 18 of the fork being arranged in the said chamber and being suitably secured to a side wall thereof by rivets 19. The chamber 17 is also adapted to accommodate the blade 11 of the knife when the latter is not in use. To this end the said chamber is of a height substantially greater than the thickness of the shank 18 of the fork, it being noted that the shank 18 of the fork and the blade 11 of the knife are arranged in the chamber 17 in side-by-side relation. Preferably the chamber 17 is of a depth which will enable the blade 11 to be completely sheathed by the handle 12 as shown.

When the knife and fork are fitted together, they are first adjusted so that the shank 15 of the knife is arranged at the bottom of the chamber 14 while the shank 18 of the fork is arranged at the top of the chamber 17, or vice versa. When the parts are arranged in this manner or in any similar opposed relation, the tines of the fork will enter the chamber 14 as the blade of the knife enters the chamber 17. Thus the handle of the knife provides a scabbard for the tines of the fork while the handle of the fork provides a scabbard for the blade of the knife. The implement may, therefore, be carried in safety.

The parts are preferably so formed that as they are fitted together in the manner described, the adjacent ends of the handles 10 and 12 will abut one another as best shown in Figure 1 to provide a compact unit. In order to insure that the said parts will remain in such relation until required for further use the curvature of the tines 13 and the associated portion of the shank 18 is predetermined so that as the parts are fitted together, the tines 13 of the fork will first engage the shank 15 of the knife and thereafter engage a wall of the chamber 14 as they move beyond the end of the said shank. It is understood, of course, that if desired the shank 15 may be extended the full length of the chamber 14 so that the tines of the fork will engage it when the adjacent ends of the handles 10 and 12 abut one another. The frictional engagement thus provided between the tines 13 and the adjacent portion of the knife serves to secure the knife and fork together and to hold them against accidental separation.

Preferably the handles 10 and 12 are similar and are formed so as to provide ready access to the chambers 14 and 17 and thereby facilitate their cleaning. Each handle, as illustrated, includes a main section 20 to which the shank of the knife or fork, as the case may be, is secured and an auxiliary section 21, the said sections defining the chambers 14 and 17. The main and auxiliary sections are held together by bands 22 and 23, the former being permanently secured by a rivet 19 to the main section while the latter is permanently secured by a rivet 25 to the auxiliary section. The outer end of the main section is formed with a neck 26 which fits under the band 23 while the inner end of the auxiliary section is formed with a neck 27 which fits under the band 22. The main and auxiliary sections are held against relative lengthwise movement by projections 28 and 28a, the former being formed in the band 23 and co-operating with a depression formed in the neck 26 of the main section while the latter is formed in the band 22 and co-operates with a depression formed in the neck 27 of the auxiliary section. The auxiliary section may be detached from the main section to provide access to the chamber 14 or 17, as the case may be, by moving it lengthwise relatively to the main section until the band 23 slips off the neck 26 of the main section and the neck 27 is moved out from under the band 22.

In order to facilitate the detachment of the auxiliary sections in the manner described the outer wall of each of the main sections is cut away in the vicinity of the band 23 to provide a shoulder 30 (Figures 2 and 3), the said shoulders being spaced from the inner edges of the bands 23 to define slots 31 and 31a. The slot 31 is formed in the handle of the fork and is of a width which will accommodate the thick edge of the blade of the knife while the slot 31a is formed in the handle of the knife and is of a width which will accommodate the shank 17 of the fork. Hence, when it is desired to detach the auxiliary section of the fork handle the thick edge of the blade of the knife is inserted in the slot 31 and then pivoted in the slot to force the band 23 away from the shoulder 30. By manipulating the knife in this manner, the auxiliary section of the fork handle may be moved lengthwise to such an extent as to free it from the main section. The sections of the knife handle may be separated in a similar manner, it being understood that in this case the shank 18 of the fork is inserted in the slot 31a and is utilized as the lever for separating the main and auxiliary sections in the manner described. In the embodiment illustrated, the main and auxiliary sections are formed of a fibrous material. In such a case, and in any case in which the material from which the handle sections are formed is relatively soft, it is preferred that the shoulders 30 be provided by metal elements 32, the said elements being suitably secured to the handle sections.

I claim as my invention:

An implement for the purpose described including as companion separable parts, a knife and a fork, each having a handle formed with a chamber, whereby as said parts are assembled the tines of said fork enter the chamber in the handle of said knife while the blade of said knife enters the chamber in the handle of said fork, at least one of the said handles having a section which may be removed to provide access to the chamber in said handle.

HENRY RINGER.